Jan. 23, 1945.    J. P. BUCKEY    2,367,995
COMPOSITION FOR TREATING ABRASIVE BODIES
Filed Nov. 2, 1942

INVENTOR.
JEFFERSON PAUL BUCKEY
BY
ATTORNEYS

Patented Jan. 23, 1945

2,367,995

UNITED STATES PATENT OFFICE 2,367,995

COMPOSITION FOR TREATING ABRASIVE BODIES

Jefferson Paul Buckey, Cleveland, Ohio, assignor to Electronic Products, Inc., Cleveland, Ohio, a corporation of Ohio Application November 2, 1942, Serial No. 464,192

2 Claims. (Cl. 51—295)

This invention relates to abrasive bodies such as grinding wheels and the like, and to a composition for treating such bodies to increase their abrasive characteristics and durability.

An object of the invention is to provide a novel composition for treating abrasive bodies for introducing thereinto an activated graphite and a cement which holds or assists in holding the graphite in such bodies.

Other objects and advantages of the invention will be apparent from the following description.

Figure 1:
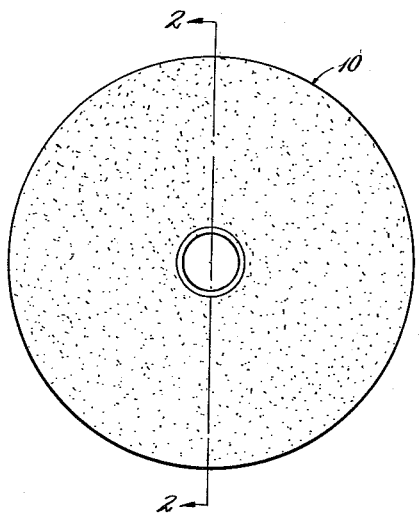
Figure 2:
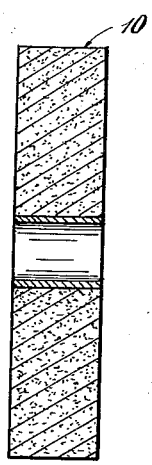

In the accompanying sheet of drawing:

Fig. 1 is a plan view of a grinding wheel which has been treated according to my invention; and Fig. 2 is a sectional view taken through the wheel on line 2—2 of Fig. 1.

Although my invention is applicable to the treatment of various abrasive bodies, it is especially suitable for the treatment of grinding wheels and is hereinafter described in this connection but without any intent to limit the invention in this respect. As will be pointed out more in detail hereinafter, my novel composition and treatment are used to introduce or incorporate activated graphite into an abrasive wheel in a manner such that the graphite particles will be securely held. Comparative tests show that abrasive wheels having activated graphite incorporated therein are more durable and economical than untreated wheels and have superior abrasive characteristics.

The grinding wheels to be treated may be of the usual type or construction found in the abrasive art such as a unitary and substantially homogeneous bonded body 10 containing an abrasive grain. The abrasive grain may be crystalline aluminum oxide, crystalline silicon carbide, crystalline bauxite, emery, quartz, or the like. The binder may be any one of suitable synthetic resins, including Bakelite, or it may be a vitreous substance, a silicate, a clay, or rubber. The invention is also applicable to the abrasive segments or sections used in assembled or segmental grinding wheels.

One example of a liquid composition for the treatment of abrasive bodies according to my invention is prepared with the following ingredients:

| | Parts |
|---|---|
| Activated graphite | 2 to 50 |
| Water soluble casein | 5 to 25 |
| Water as a solvent or vehicle for the casein | 100 to 500 |

As above specified, the graphite is an activated graphite, and by the term "activated" I mean a substantially chemically pure relatively finely divided porous graphite. The activated graphite may be obtained from various sources or in various ways such as by the method disclosed in my earlier application, Serial No. 426,654 filed January 14, 1942, wherein commercial graphite is treated with an electrolytic solvent and subjected to the action of an electric current.

The above specified ingredients are mixed thoroughly and the resulting liquid composition is heated to boiling temperature, that is, approximately 212° F. The grinding wheels or other abrasive bodies to be treated are immersed in the heated composition and are soaked therein for a sufficient period to enable the composition to thoroughly penetrate the same. The period of treatment may vary considerably, depending upon the density and other characteristics of the abrasive wheels and may vary in duration from fifteen minutes to approximately eight hours. During this soaking of the wheels the composition is maintained at substantially a boiling temperature and is agitated to prevent settling and to insure a substantailly uniform distribution of the activated graphite and casein to all portions of the wheels. The heating of the composition and the wheels during the soaking operation is important because it opens the pores or interstices of the wheel as well as the pores of the particles of the bond and the pores of the abrasive grain crystals to admit the composition.

After the wheels have been soaked in the composition for the desired period, they are removed and the liquid is permitted to drain therefrom. In addition to such draining of the wheels, they can, if desired, also be subjected to a centrifugal action or spinning operation for expelling additional liquid therefrom. The treated wheels are then subjected to a drying or baking operation during which the remaining liquid is driven out. The drying or baking may be carried out at a moderate heat, for example, 180° F. to 300° F., and for a sufficient period of time to cause all or substantially all of the liquid to be expelled or driven from the wheels in the form of vapor.

Abrasive bodies which have been treated in the manner above described will be found to have activated graphite and casein distributed substantially uniformly throughout the same. The activated graphite and casein are carried into the pores or interstices of the wheel and the activated graphite enters the opened pores of the particles of the bond and the opened pores of the abrasive grain crystals. When the treated body has been dried, it is permitted to cool, which causes the pores of the abrasive grain crystals and of the particles of the bonding material to close and grip the particles of activated graphite therein. The dried casein serves as a cement which tenaciously holds the particles of graphite in the pores or interstices of the wheel. The amount of activated graphite and casein retained in the treated grinding wheels will vary more or less and is dependent upon the density of the wheels being treated, the character of the bond used therein, the length of the period of treatment, and possibly other factors. The percentage of activated graphite retained in the treated wheels is probably in the neighborhood of 2% of the weight of the wheel, and the amount of casein retained may likewise be in the neighborhood of 2% of the weight of the treated wheel.

I have disclosed above the use of casein as a cement which assists in holding the activated graphite in the treated wheels, but various other substances can be used as the cement or retaining medium for the activated graphite. It is desirable that the cement be oil-resistant as well as substantially non-hygroscopic and substantially non-deliquescent so that it will not lose its holding properties in the presence of moisture and so that the abrasive wheels can be used in grinding operations where water, oil, or other coolants are employed without resulting in the cement being weakened or washed out. The use of casein as the cement for the activated graphite is especially desirable in the treatment of wheels having a bond made of rubber or a rubber-containing substance because the water which is used as the solvent or vehicle for the casein does not produce a deteriorating effect on the rubber.

Although casein serves very satisfactorily as the cement for the activated graphite, I can use as the cement any one of various resins in solution such as shellac, lacquer, and Bakelite. When a resin of this kind is employed as the cement for the activated graphite, the solvent should be a volatile liquid such as alcohol, ether, benzine, or the like which can be driven out of the treated wheel during the drying or baking operation. When shellac or one of the other resins is employed as the cement, the amount of the resin and solvent or vehicle used in forming the composition should be such that the composition will penetrate the abrasive wheel to the desired extent to carry the activated graphite thereinto and will form a tenacious cement for retaining the graphite in the pores or interstices of the treated wheel after the solvent has been expelled. A composition of the character just described may be prepared with the following ingredients:

| | |
|---|---|
| Shellac | Approximately 1 quart |
| Alcohol as a solvent or thinner for the shellac | Approximately 2 gallons |
| Activated graphite | 2% to 50% by weight |

It may be desirable to add to the above-described compositions a small amount of sodium hydroxide (technical grade) to produce an etching or roughening effect on the particles of the bond embodied in the abrasive wheel. The amount of sodium hydroxide added to the composition may be from .1% to .5% by weight, although a larger or smaller quantity may be used, depending upon the characteristics of the abrasive wheels being treated. During the soaking of the wheels in the composition the sodium hydroxide etches or roughens the surface of the particles of the bond, enabling the casein to adhere firmly to such particles for connecting the activated graphite therewith.

I also consider it desirable to allow the abrasive wheels to age after they have been treated. The ageing period may be varied according to the size and other characteristics of the wheels being treated and the results desired to be achieved, but a period of approximately ninety hours is considered to be satisfactory for the ageing step. The ageing of the treated wheels permits a completion of the oxidation and other chemical changes which may occur in the cement and which changes render the cement substantially non-hygroscopic and substantially non-deliquescent. At the completion of the ageing step the treated wheels are ready for use for various grinding or abrading operations, and it will be found that when abrasive bodies have been subjected to the treatment herein disclosed, they will be much more durable than grinding wheels heretofore produced and will have superior abrasive characteristics. The activated graphite in the treated wheels acts as an abrasive and as heat conducting medium as well as a lubricant for the abrasive grain. Grinding wheels which have been treated as herein disclosed cut much faster than untreated wheels and do so without burning the metal.

While I have described my improvement in considerable detail, it will be understood, of course, that I intend my invention to include all modifications and variations coming within the scope of the appended claims.

Having thus described my invention, I claim:

1. A liquid composition for treating abrasive bodies comprising activated graphite, a cement, a solvent for the cement, and sodium hydroxide.

2. A liquid composition for the treatment of abrasive bodies comprising activated graphite, casein, water, and sodium hydroxide.

JEFFERSON PAUL BUCKEY.